June 3, 1930.  W. NOBLE  1,761,678
METERING INSTRUMENT
Filed Aug. 22, 1927  2 Sheets-Sheet 1

Inventor
Warren Noble.

By
Attorney

June 3, 1930.  W. NOBLE  1,761,678
METERING INSTRUMENT
Filed Aug. 22, 1927   2 Sheets-Sheet 2

Inventor
Warren Noble.

By

Attorney

Patented June 3, 1930

1,761,678

UNITED STATES PATENT OFFICE

WARREN NOBLE, OF DETROIT, MICHIGAN

METERING INSTRUMENT

Application filed August 22, 1927. Serial No. 214,615.

This invention relates to measuring or metering instruments of the type generally known as speedometers or techometers, whereby rotary, oscillating or reciprocating speed or frequency is indicated, or whereby peripheral speed of the rotary object is determined by its rotary speed, and has for its object to utilize the principle of measuring the frequency of electrical impulses controlled in their frequency by a rotating body, the rotary speed of which is to be ascertained.

More particularly, the invention has for its object to utilize a contact making mechanism operated by a rotating, oscillating or reciprocating member whose frequency of action is to be measured, together with means for standardizing the character and intensity of impulses transmitted through said contact making mechanism, and a frequency sensitive indicator operable to indicate, by its reaction to said impulses, the frequency thereof, and incidentally the frequency of rotation, oscillation or reciprocation of the said member.

A further object of the said invention is to utilize, in a frequency indicating device, actuating means of a magnetic nature, wherein a magnetic field is set up by impulses controlled in their frequency by a rotating, oscillating or reciprocating member, and to utilize the tendency of an iron armature suspended freely in said magnetic field to assume a position of minimum iron length between the magnetic poles of the excited magnetic means, whereby the resulting movement of such armature may be registered to indicate the frequency of excitation of said magnetic means.

Still further the said invention contemplates the provision of a speedometer or techometer, in which an indicating dial is rotatable with an armature freely suspended in the by-polar magnetic field of an electro-magnet in such manner that rotation of the armature will reduce the iron length between the poles of the magnet, and a reaction spring against the resistance of which the armature rotates to decrease the iron length between the poles by said magnet, in combination with contact making means adapted to control the frequency of electrical impulses through the winding of said electro-magnet, and adapted to be operated by a rotating, oscillating or reciprocating member, the motions of which are to be indicated.

The invention also contemplates the utilizing, in a device of the type referred to, of a condenser alternately charged from a source of electrical energy and discharged through the said electro-magnet by the operation of the said contacting means, operated by the member, the movements of which are to be indicated.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide a meter casing housing a rotatable graduated dial, with which an iron armature in the form of an incomplete ring is also rotatable, one end of said armature being connected by an iron arm to an iron spindle, an electro-magnet extending in spaced relation between said spindle and said ring of the armature, a condenser one side of which is connected, as by grounding, with one end of the electro-magnet winding, a two-way switch having one terminal connected with a source of electric energy and the other with the winding of said magnet, a contact member operating between said terminals and connected with one side of said condenser, an actuator operating said contact member to alternately bring it into contact with one or other of said terminals, said actuator being adapted to operation by a member the movements of which are to be indicated by the said dial, and the reaction spring resisting the rotation of said armature under the influence of the attraction of said magnet when excited by electrical impulses through its winding upon the operation of said contact member. All of which is more particularly described and ascertained hereinafter, by way of example, having reference to the accompanying drawings, wherein:—

Similar characters of reference indicate similar parts in the several figures of the drawings.

Figure 1:
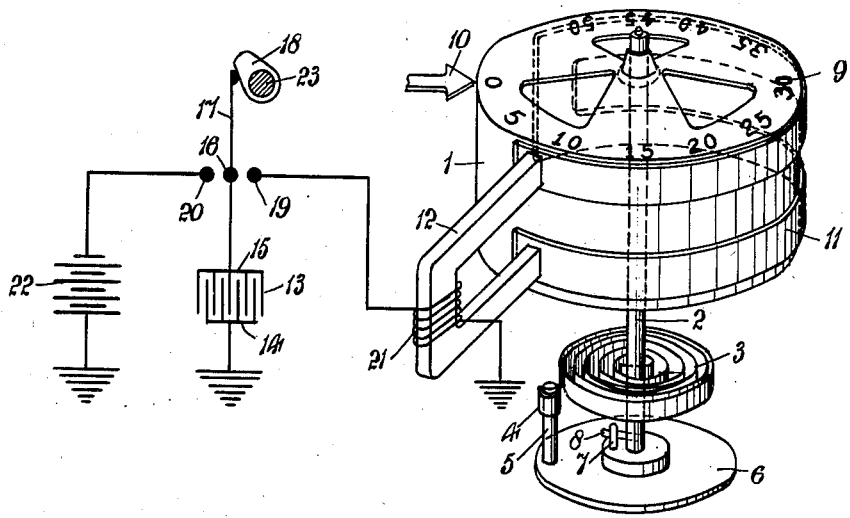
Figure 1 is a schematic diagram indicating the principles embodied in this invention applied to a frequency indicating device.

In Figure 1, a non-magnetic drum 1 is shown as having a spindle 2 rotatable on a base 6, which spindle is yieldably held against rotation by reaction spring 3, the fixed outer end 4 of which is engaged and located by a pin 5, extending upwardly from the fixed base 6. The said base is also shown as being provided with an abutment 7 against which a stop 8 impinges when the spindle is held in its normal position by the said reaction spring.

The upper face of the drum 1 is provided with indicating characters or graduations 9 arranged about its margin, and 10 is a cursor indicating, by the relation of the indicating characters thereto, the extent of rotation of the drum from its normal position.

11 is an iron armature of U configuration with the legs thereof bent to the circular form of the drum and embracing the said drum, and 12 is an electro-magnet, the poles of which are presented to but spaced from the legs of the said armature, the location of the said magnet being such that in the normal position of the drum 1, the extremities of the legs of the armature are adjacent to the poles of the magnet, and the bridge of the armature remote therefrom.

13 is a condenser, one of the sides 14 of which is grounded, and the other side 15 connected to a contact member 16, which member is movable through the medium of a trembler 17 and a cam 18 into alternate contact with terminals 19 and 20. The terminal 19 is connected with a winding 21 of the electro-magnet 12, the other end of which winding is grounded, and the terminal 20 is connected with one pole of a battery 22, or other suitable source of electric energy, the other pole of which is also grounded. 23 indicates a shaft, the rotary speed of which is registered by the magnetic device previously described.

The operation is as follows:—As the shaft 23 rotates, the cam causes the trembler 17 to move the contact member 16 into contact with the terminal 20, whereupon the condenser 13 is charged, following which the receding cam permits the trembler to move in the opposite direction, closing a discharge circuit from the condenser through the contact member 16, terminal 19 and winding of the electro-magnet, thus setting up a magnetic condition therein, the resulting magnetic force causing rotation of the drum 1 due to the effort of the magnetic force to pass through the armature 11 by the shortest course, which would be directly through the bridge of the armature instead of throughout the legs of the armature and the bridge.

This effort tends to move the bridge toward the poles of the magnet, and consequently rotates the drum against the resistance of the reaction spring 3, the extent of the movement being controlled by the difference between the force and the resistance of the said spring 3. As the shaft continues to rotate, the condenser is alternately charged from the battery 22, and discharged through the winding of the electro-magnet, so that a series of electrical impulses are set up, resulting in frequent exciting of the electro-magnet, the frequency increasing with the speed of the shaft; and it will be quite apparent that with the increase of such frequency the resistance of the spring 3 is increasingly overcome, and the extent to which the drum 1 is accordingly rotated will be indicative of such frequency. Thus, the indicating characters may be definitely arranged to visually indicate the frequency of rotation of the shaft 23 and it will be obvious that as the resistance of the spring increases so also does the effectiveness of the magnetic force tending to rotate the drum increase, due to the shortening of the lines of force through the armature, and a general balance between these conditions may be obtained, admitting of an even distribution of the indicating characters about the drum of the device in a very desirable manner.

It should also be noted that the battery is never in circuit with the winding of the magnet, but only serves to charge the condenser, so that drain on the battery may be quite low, and, losses and other objections due to arcing at the terminal 20 are minimized as at the time of breaking contact between the contact member 16 and the said terminal 20, there is a state of equilibrium between the battery and the condenser which prevents such arcing.

Figure 2:
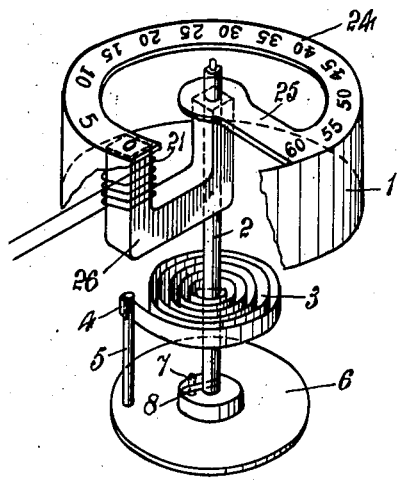
Figure 2 is a similar view to Figure 1 of a modified arrangement of the indicating device.

In Figure 2, a modified form of armature 24 is shown, which is that of a discontinuous ring, one end of which is provided with a radial spoke 25, the inner end of which is pivoted over one pole of a vertically arranged electro-magnet 26, and the free end of the ring passes over the other pole of the said magnet, the armature rotating about one pole of the magnet with the ring of the said armature moving over the other pole thereof. The electrical operation is the same in the arrangement as described in reference to Figure 1.

Figure 3:
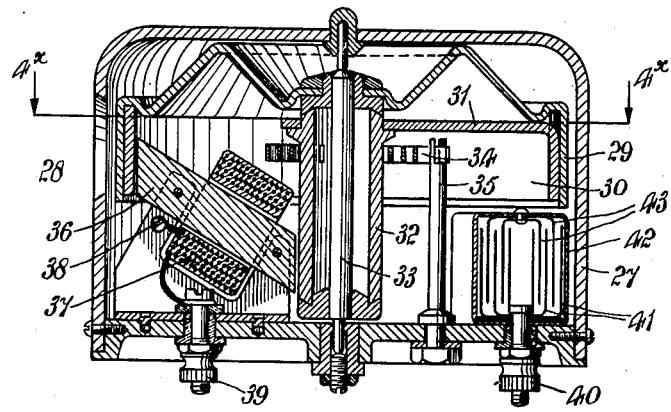
Figure 3 is a sectional elevation of a speedometer or tachometer constructed in accordance with this invention, the section being taken on the line 3×—3×, Figure 4.
Figure 4:
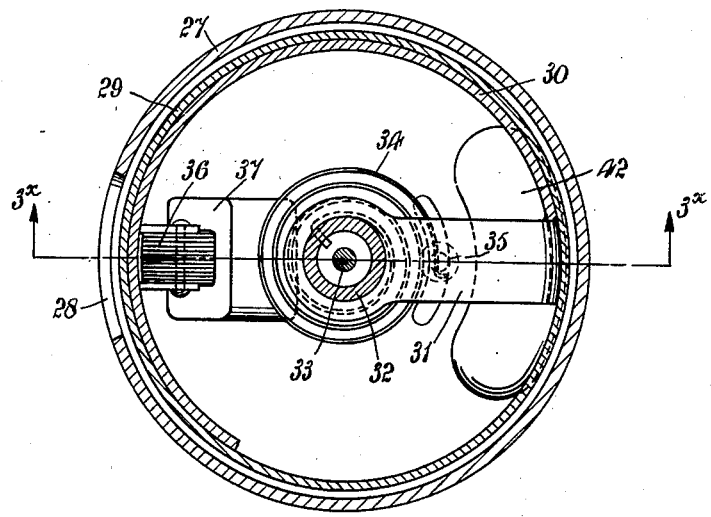
Figure 4 is a horizontal sectional view of the same taken on the line 4×—4×, Figure 3.

In Figures 3 and 4, an instrument suitable for use with the switching device already described, and adapted to operate as a speedometer or tachometer, is shown comprising a meter casing 27 having an opening 28 therein through which the periphery of a drum 29 may be viewed, the periphery of this drum being provided, if desired, with suitable figures or markings (not shown) to indicate the extent of which it may be rotated from its normal rest position.

Within this drum, which is of non-magnetic material, is an iron armature 30 in the form of an incomplete ring, one end of which is connected by an iron arm 31 with an iron sleeve 32 mounted on the spindle 33 which forms the pivot for the drum 29. This sleeve is connected to the inner end of a reaction spring 34, the outer end of which is secured to a post 35. 36 is the core of an electro-magnet the poles of which are respectively presented towards the iron sleeve 32 of the armature 29 and to the ring of the said armature at a point remote from the arm 31 thereof as clearly shown in Figure 4; the winding 37 of the electro-magnet having one end grounded at 38 and the other connected to a terminal 39 through the agency of which it may be connected to the impulse controlling means such as to the contact 19 of the switch indicated in Figure 1.

A further terminal 40 provides for connection with the contact 20 of such switch and is connected with plates 41 of a condenser 42 arranged within the meter casing, the other plates 43 of the said condenser being grounded through the condenser casing and the casing of the meter.

The operation of the meter is that already described in connection with Figures 1 and 2, the drum rotating with the armature upon excitation of the magnet 36 and to an extent depending upon the frequency of such excitation as will be understood from the foregoing explanation of the principles involved.

This invention may be developed within the scope of the following claims without departing from the essential features of the said invention, and it is desired that the specification and drawings be read as being merely illustrative and not in a limiting sense, except as necessitated by the prior art.

What I claim is:—

1. In an electric speedometer, a support, a revoluble graduated drum on said support, a plurality of iron elements, at least one of which is carried by said drum, an iron path connecting all of said elements, all of said elements comprising an armature, an electro-magnet having one of its pole pieces exposed to an element carried by said drum, rotation of said drum under influence of said magnet reducing the magnetic distance between the pole pieces thereof, means for exciting said magnet and yielding means for resisting rotation of said drum.

2. In an electric speedometer, a support, a graduated drum rotatably mounted on said support, a peripherally disposed armature on said drum, an electro-magnet, one of the pole pieces of said magnet being presented to one end of said armature, the other of said pole pieces being presented to another end of said armature, an iron path connecting said ends at a normally remote point from said magnet, rotation of said drum reducing the distance of said connecting path from said pole pieces, means for exciting said magnet whereby said drum is rotated and yielding means for resisting said rotation.

3. In an electric speedometer, a support, a graduated drum rotatably mounted on said support, a peripherally disposed armature on said drum, an electro-magnet, one of the pole pieces of said magnet being presented to one end of said armature in constant relation, the other of said pole pieces being presented to the other end of said armature in variable relation, an iron path connecting said ends at a normally remote point from said magnet, rotation of said drum reducing the distance of said connecting path from said pole pieces, means for exciting said magnet whereby said drum is rotated and yielding means for resisting said rotation.

4. In an electric speedometer, a support, a graduated drum rotatably mounted on said support, a peripherally disposed armature on said drum, an electro-magnet within said drum, said armature normally presenting an extended iron path between the pole pieces of said magnet, said path diminishing with the rotation of said drum in one direction, means for causing said electro-magnet to be excited, and yielding means resisting rotation of said drum.

5. In an electric speedometer, a support, a graduated drum rotatably mounted on said support, a peripherally disposed armature on said drum having an inwardly extending arm, an electro-magnet within said drum having one pole piece presented to said arm and the pole piece to the peripheral portion of said armature, said armature normally presenting an extended iron path between the pole pieces of said magnet, said path diminishing with rotation of said drum in one direction, means for causing said electro-magnet to be excited and yielding means resisting rotation of said drum.

6. In an electric speedometer, a support, a graduated drum, an inwardly disposed iron arm on said drum rotatably mounted on said support, a peripherally disposed armature on said drum in contact with said arm, an electro-magnet within said drum, said armature and said arm normally presenting an extended iron path between the pole pieces of said magnet, said path diminishing upon rotation of said drum in one direction, means for causing the magnet to be excited causing said path to be diminished in proportion to the degree of excitation and means for resisting said rotation.

7. In an electric speedometer, a support having an iron casing therearound, a graduated drum rotatably mounted on said support, a peripherally disposed armature on said drum having an arm extending inwardly from said casing, an electro-magnet within said drum presenting one pole piece to said casing and one pole piece to the peripheral portion of said armature whereby an extended iron path is normally provided between said pole pieces, said path diminishing upon rotation of said drum in one direction, means for exciting said magnet thereby causing rotation of said drum and means for resisting said rotation.

8. In an electric speedometer, a support, a graduated drum rotatably mounted on said support, a peripherally disposed ring on said drum, an iron path from said ring to said support, an iron casing around said support in communication with said iron path, an electro-magnet within said drum presenting one of its pole pieces to said casing the other of its pole pieces to said peripherally disposed ring, said peripheral ring, said casing and the iron path extending therebetween comprising an armature, said armature normally presenting an extended iron path between the poles of said magnet, said path diminishing upon rotation of said drum in one direction, means for causing said electro-magnet to be excited thereby causing rotation of said drum and yielding means resisting said rotation.

9. In an electric speedometer, a support, a graduated drum carried by said support, an armature having at least one end carried on the periphery of said drum and the other end comprising a portion of said support, an electro-magnet presenting one of its pole pieces to one end and the other of its pole pieces to the other end of said armature, said armature normally presenting an extended iron path between said poles, said path diminishing upon rotation of said armature in one direction, means for causing said drum to rotate and yielding means acting against said support for resisting rotation of said drum.

10. In an electric speedometer, a casing having a window therein, a support rotatably mounted on the floor of said casing, a graduated drum carried by said support and readable thru said window, an electro-magnet fixedly supported within said casing, an armature having one end fixed and one end carried by said drum, said armature normally presenting an extended iron path between the pole pieces of said magnet, said path diminishing with rotation of said drum in one direction, means for causing said electro-magnet to be excited thereby effecting rotation of said drum and yielding means within said casing for resisting rotation of said drum.

11. In an electric speedometer, a casing, a support rotatably mounted in said casing having an iron housing therearound, a graduated drum fixedly mounted on said support, an iron element peripherally disposed on said drum, a second iron element connecting said first named iron element and said housing, said elements and said housing comprising an armature, an electro-magnet having one pole piece presented to said casing and the other pole piece presented to said first named element, said armature normally presenting an extended iron path between the pole pieces of said magnet, said path diminishing upon rotation of said drum in one direction, means for exciting said magnet thereby causing rotation of said drum and yielding means within said casing acting against said housing for resisting rotation of said drum.

In testimony whereof I affix my signature.

WARREN NOBLE.